UNITED STATES PATENT OFFICE.

EUSTACE HAROLD GANE, OF NEW YORK, N. Y., ASSIGNOR TO McKESSON AND ROBINS, OF NEW YORK, N. Y., A FIRM.

DENTIFRICE.

No. 802,099. Specification of Letters Patent. Patented Oct. 17, 1905.

Application filed July 29, 1904. Serial No. 218,947. (Specimens.)

*To all whom it may concern:*

Be it known that I, EUSTACE HAROLD GANE, a citizen of the United States, residing at New York, in the borough of Manhattan and State of New York, have invented certain new and useful Improvements in Dentifrices, of which the following is a specification, reference being had therein to the accompanying drawings.

My invention relates to a composition powder dentifrice having antiseptic, germicidal, and detergent qualities.

It is a well-known fact of chemistry that hydrogen dioxid possesses the property of decomposing dead organic matter by virtue of its oxidizing power, which depends upon the readiness of the hydrogen dioxid to part with one of its atoms of oxygen, by which the hydrogen dioxid is converted into water and oxygen. Upon this same oxidizing power the well-known antiseptic and germicidal properties of hydrogen dioxid also depend. These qualities naturally possessed by hydrogen dioxid make it particularly valuable and useful as a cleansing and antiseptic material for use in the mouth, especially as it is non-poisonous and without any deleterious effect upon living tissue. In United States Letters Patent No. 760,397, granted May 17, 1904, to Edward C. Kirk, William James Evans, and myself, is described a powder dentifrice having as an ingredient a substance which in the presence of acids will be transformed into hydrogen dioxid; but with that exception, so far as I am aware, it has not been thought possible to incorporate hydrogen dioxid into a powder composition without its losing the valuable properties above spoken of, and hence its use as a dentifrice had therefore been confined to liquid form.

The object of my invention is to produce a dentifrice composition of powder form having as an ingredient a substance which in the presence of water as distinguished from acids will be transformed into hydrogen dioxid.

My invention comprehends a powdered dentifrice having as an ingredient percarbonates or perborates of the alkali and alkaline earth metals which when brought into contact with moisture undergo decomposition, resulting in the formation of hydrogen dioxid.

The invention therefore consists in combining with any of the usual well-known or suitable tooth-powder materials which provide the requisite or desired antacid, detergent, and abrasive or cleansing properties one of the percarbonates or perborates of the alkali or alkaline earth metals—as, for example, a percarbonate or perborate of ammonium, sodium, potassium, calcium, or magnesium can be employed with great success, as I have found by experiments. It is possible by incorporating these ingredients in the composition to confer upon a powder dentifrice the antiseptic, detergent, and cleansing properties which hydrogen dioxid possessed in liquid form and at the same time obtain the further advantage which the physical and chemical properties of a powder dentifrice possesses over a liquid dentifrice. These properties are the antacid property of the chalk used as the tooth-powder base and the mechanically-detersive property of the chalk base, which by friction of its ultimate particles helps to mechanically remove adherent deposits upon the surfaces of the teeth. The addition of these salts to a tooth-powder base confers upon the dentifrice such germicidal and antiseptic properties that the product serves the double purpose of a tooth-powder and mouth-wash combined.

For practical purposes I have ascertained that about one per cent. of percarbonate or perborate of the alkali or alkaline earth metal is sufficient to accomplish the detergent and germicidal ends above described when incorporated in a powder dentifrice intended for habitual daily use, although a smaller or larger proportion may be used, as occasion requires. A suitable dentifrice composition may consist, for example, of ninety-six per cent. precipitated chalk, three per cent. powdered castile-soap, and one per cent. of a percarbonate or perborate, together with flavoring and coloring matter, as preferred. These proportions may be altered and other ingredients added to or substituted for those mentioned, as described.

In this specification I have employed the terms "percarbonates" and "perborates" and "alkali" and "alkaline" earth metals as equivalents, and therefore in defining the invention in the claims I desire it understood that by the employment of either of such expressions the same is intended to include those equivalent substances, and is not to be limited to the specific material stated in the claims.

It is obvious that my improved powder dentifrice may be compressed into tablet form, if desired.

The percarbonates referred to have the general formula $R'_2CO_4(x)H_2O$ ($R'$ stands for any monad element) and the perborates the general formula $R'BO_3(x)H_2O$. On the addition of water these compounds are dissociated according to the following equations:

$$R_2CO_4 \text{ and } H_2O = R_2CO_3 \text{ and } H_2O_2.$$
$$R'BO_3 \text{ and } H_2O = R'BO_2 \text{ and } H_2O_2.$$

Having thus described my invention, what I claim, and desire to secure by Letters Patent, is—

1. A powdered dentifrice comprising a powdered abrading substance and a powdered percarbonate substance which when brought into contact with moisture forms an oxidizing agent such as hydrogen dioxid.

2. A dentifrice composition consisting of a percarbonate of an alkali and an abrading powder, substantially in the proportions and for the purpose herein specified.

3. A dentifrice composition consisting of percarbonate of ammonium, and powdered chalk, substantially in the proportions and for the purpose herein specified.

4. A dentifrice composition consisting of percarbonate of ammonium, powdered chalk and saponaceous substance, substantially in the proportions and for the purpose herein specified.

In testimony whereof I affix my signature in presence of two witnesses.

EUSTACE HAROLD GANE.

Witnesses:
WILBERT E. TITUS,
SIDNEY M. VAN NESS.